(12) United States Patent
Orr

(10) Patent No.: US 8,897,371 B2
(45) Date of Patent: Nov. 25, 2014

(54) VIDEO DECODING IN A RECEIVER

(75) Inventor: Brian William Orr, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1580 days.

(21) Appl. No.: 11/556,907

(22) Filed: Nov. 6, 2006

(65) Prior Publication Data

US 2007/0230581 A1 Oct. 4, 2007

Related U.S. Application Data

(60) Provisional application No. 60/789,456, filed on Apr. 4, 2006.

(51) Int. Cl.
*H04N 11/02* (2006.01)
*H04N 19/00* (2014.01)
*H04N 19/102* (2014.01)
*H04N 19/156* (2014.01)
*H04N 19/172* (2014.01)

(52) U.S. Cl.
CPC ....... *H04N 7/26335* (2013.01); *H04N 7/26111* (2013.01); *H04N 7/26202* (2013.01); *H04N 7/26271* (2013.01)
USPC ........... 375/240.21; 375/240.25; 375/E7.027; 375/E7.145; 375/E7.168; 375/E7.181

(58) Field of Classification Search
CPC .................. H04N 19/00127; H04N 19/00206; H04N 19/00266; H04N 19/00533; H04N 19/00424; H04N 19/00442; H04N 7/26335; H04N 7/26202
USPC ............... 375/240.2, 240.26, 240.21, 240.25, 375/E7.027, E7.145, E7.168, E7.181
See application file for complete search history.

(56) References Cited

U.S. PATENT DOCUMENTS

| | | | |
|---|---|---|---|
| 6,498,865 B1 | 12/2002 | Brailean et al. | |
| 7,042,944 B2* | 5/2006 | van der Schaar et al. | .. 375/240.1 |
| 8,355,452 B2* | 1/2013 | Deshpande | .............. 375/240.29 |
| 2002/0009149 A1* | 1/2002 | Rodriguez et al. | ....... 375/240.25 |

(Continued)

FOREIGN PATENT DOCUMENTS

| | | |
|---|---|---|
| CN | 1263421 A | 8/2000 |
| EP | 1513349 A2 | 3/2005 |

(Continued)

OTHER PUBLICATIONS

Isovic, D., Fohler, G.; Quality Aware MPEG-2 Stream Adaptation in Resource Constrained Systems; Jun. 30-Jul. 2, 2004; Proceedings of the 16th Euromicro Conference on Real-Time Systems; pp. 23-32.*

(Continued)

*Primary Examiner* — Behrooz Senfi
*Assistant Examiner* — Maria Vazquez Colon
(74) *Attorney, Agent, or Firm* — Albert J. Harnoise, Jr.; Elaine H. Lo

(57) ABSTRACT

The disclosure is directed to a receiver. The receiver includes a video decoder and a frame throttle configured to receive a video sequence comprising a plurality of video frames. The frame throttle is further configured to drop one or more of the video frames from the video sequence before providing the video sequence to the video decoder.

22 Claims, 6 Drawing Sheets

(56) References Cited

U.S. PATENT DOCUMENTS

| | | | |
|---|---|---|---|
| 2003/0031377 A1 | 2/2003 | Ahn | |
| 2004/0057624 A1 | 3/2004 | Wells | |
| 2004/0264577 A1* | 12/2004 | Jung | 375/240.24 |
| 2005/0117654 A1* | 6/2005 | Im | 375/240.26 |
| 2007/0217505 A1* | 9/2007 | Lipka | 375/240.02 |

FOREIGN PATENT DOCUMENTS

| | | |
|---|---|---|
| WO | 03103289 A1 | 12/2003 |
| WO | WO2004054270 A1 | 6/2004 |
| WO | 2005117445 A1 | 8/2005 |

OTHER PUBLICATIONS

Daami, M., Georganas, N.D.; Client Based Synchronization Control of Coded Data Streams; Jun. 3-Jun. 6, 1997; Proceedings of IEEE International Conference on Multimedia Computing and Systems; pp. 387-394.*

Huang et al.; Adaptive Live Video Streaming by Priority Drop; Proceedings of IEEE Conference on Advance Video and Signal Based Surveillance; pp. 342-347; 2003).*

Daami et al. ("Client Based Synchronization Control of Coded Data Streams"; Proceedings of IEEE International Conference on Multimedia Computing and Systems; pp. 387-394; Jun. 3-6, 1997).*

Isovic et al. ("Quality aware MPEG-2 Stream Adaptation in Resource Constrained Systems"; Proceedings of the 16th Euromicro Conference on Real-Time Systems; pp. 23-32; 2004).*

Isovic Damir et al., "Quality Aware MPEG-2 Stream Adaptation in Resource Constrained Systems," Proceedings. 16th Euromicro Conference on Real-Time Systems IEEE Compu. Soc Los Alamitos, CA, USA, 2004, pp. 23-32.

Daami Mourad et al., "Client Based Synchronization Control of Coded Data Streams," Multimedia Computing and Systems '97. Proceedings., IEEE International Conference on Ottawa, Ont., Canada, Jun. 3-6, 1997, Los Alamitos, CA, USA, IEEE Comput. Soc, US, Jun. 3, 1997, pp. 387-394.

Bavier Andy et al., "Predicting MPEG Execution Times," University of Arizona, Department of Computer Science, Technical Report TR-97-15, [Online] 1997, URL:http://www.cs.arizona.edu/research/reports.html.

PCT Search Report, Sep. 3, 2007.

Taiwan Search Report—TW096111842—TIPO—Sep. 16, 2011.

* cited by examiner

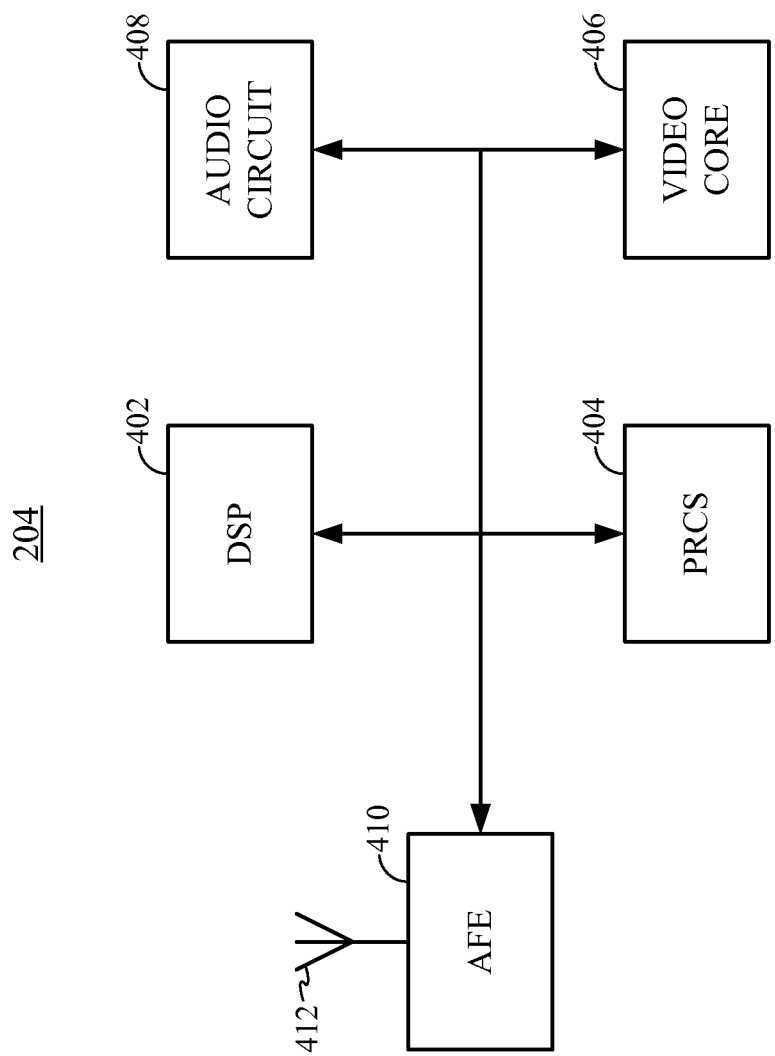

US 8,897,371 B2

VIDEO DECODING IN A RECEIVER

CLAIM OF PRIORITY UNDER 35 U.S.C. §119

The present Application for Patent claims priority to Provisional Application No. 60/789,456 entitled "A Method and Apparatus For CPU Optimized Selective Decoding" filed Apr. 4, 2006, and assigned to the assignee hereof and hereby expressly incorporated by reference herein.

BACKGROUND

1. Field

The present disclosure relates generally to telecommunication systems, and more particularly, to concepts and techniques for video decoding in a receiver.

2. Background

In the world of telecommunications, where bandwidth comes at a premium, video encoding plays an important role. Video encoding can dramatically reduce the amount of information that must be sent across a transmission medium to reproduce a video image at the receiver. This is achieved by exploiting the fact there are very few differences between two adjacent frames in a video sequence. Often, the only difference is that some parts of the image have shifted slightly between frames. Video encoding is the process of generating information that represents this difference and then compressing that information.

At the receiver, the compressed information is decoded in order to recover the image. The amount of time required to decode each frame is dependent on the amount of information in that frame. When operating in real time, a video decoder should maintain an average decoding time of less than 1/(frame rate) "$T_{AVG}$". However, despite sophisticated video encoding techniques, it is still possible that the real time constraints of the system will still not be met if a given number of frames have a high level of informational content. This may be especially true if the video decoding is performed by a central processing unit (CPU) that is shared with other receiver functions. If the real time constraints are not met, the video image may appear to stall or lose synchronization with the audio. In addition, video frames will be lost because there is not enough time to decode them all.

Accordingly, there is a need in the art for techniques to selectively drop frames in a video sequence to optimize the use of the receiver's computational resources, while at the same time minimize any reduction in picture quality when the video frames contain a high level of informational content.

SUMMARY

One aspect of a receiver is disclosed. The receiver includes a video decoder, and a frame throttle configured to receive a video sequence comprising a plurality of video frames, the frame throttle being further configured to drop one or more of the video frames from the video sequence before providing the video sequence to the video decoder.

One aspect of a method of decoding video frames is disclosed. The method includes receiving a video sequence comprising a plurality of video frames, decoding the video sequence, and dropping one or more of the video frames from the video sequence before decoding the video sequence.

Another aspect of a receiver is disclosed. The receiver includes means for receiving a video sequence comprising a plurality of video frames, means for decoding the video sequence, and means for dropping one or more of the video frames from the video sequence before providing the video sequence to the decoding means.

BRIEF DESCRIPTION OF THE DRAWINGS

Various aspects of a wireless communications system are illustrated by way of example, and not by way of limitation, in the accompanying drawings, wherein:

FIG. 4 is a block diagram illustrating an example of a hardware implementation of a receiver;

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The concepts and techniques described herein may be used in various wired and wireless communication systems. Examples of wired systems include Ethernet systems, Digital Subscriber Lines (DSL), cable modem, fiber optics, standard telephone lines, and others. Examples of wireless systems include cellular systems, broadcast systems, wireless local area network (WLAN) systems, and others. The cellular systems may be Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier FDMA (SC-FDMA) systems, and other multiple access systems. The broadcast systems may be MediaFLO systems, Digital Video Broadcasting for Handhelds (DVB-H) systems, Integrated Services Digital Broadcasting for Terrestrial Television Broadcasting (ISDB-T) systems, and other broadcast systems. The WLAN systems may be IEEE 802.11 systems, Wi-Fi systems, and others. These systems are known in the art.

The concepts and techniques described herein are well suited for systems with a single subcarrier as well as systems with multiple subcarriers. Multiple subcarriers may be obtained with OFDM, SC-FDMA, or some other modulation technique. OFDM and SC-FDMA partition a frequency band (e.g., the system bandwidth) into multiple orthogonal subcarriers, which are also called tones, bins, etc. Each subcarrier may be modulated with data. In general, modulation symbols are sent on the subcarriers in the frequency domain with OFDM and in the time domain with SC-FDMA. OFDM is used in various systems such as MediaFLO, DVB-H and ISDB-T broadcast systems, IEEE 802.11a/g WLAN systems, and some cellular systems. Certain aspects and configurations of a receiver are described below for a broadcast system that uses OFDM, e.g., a MediaFLO system.

Figure 1:
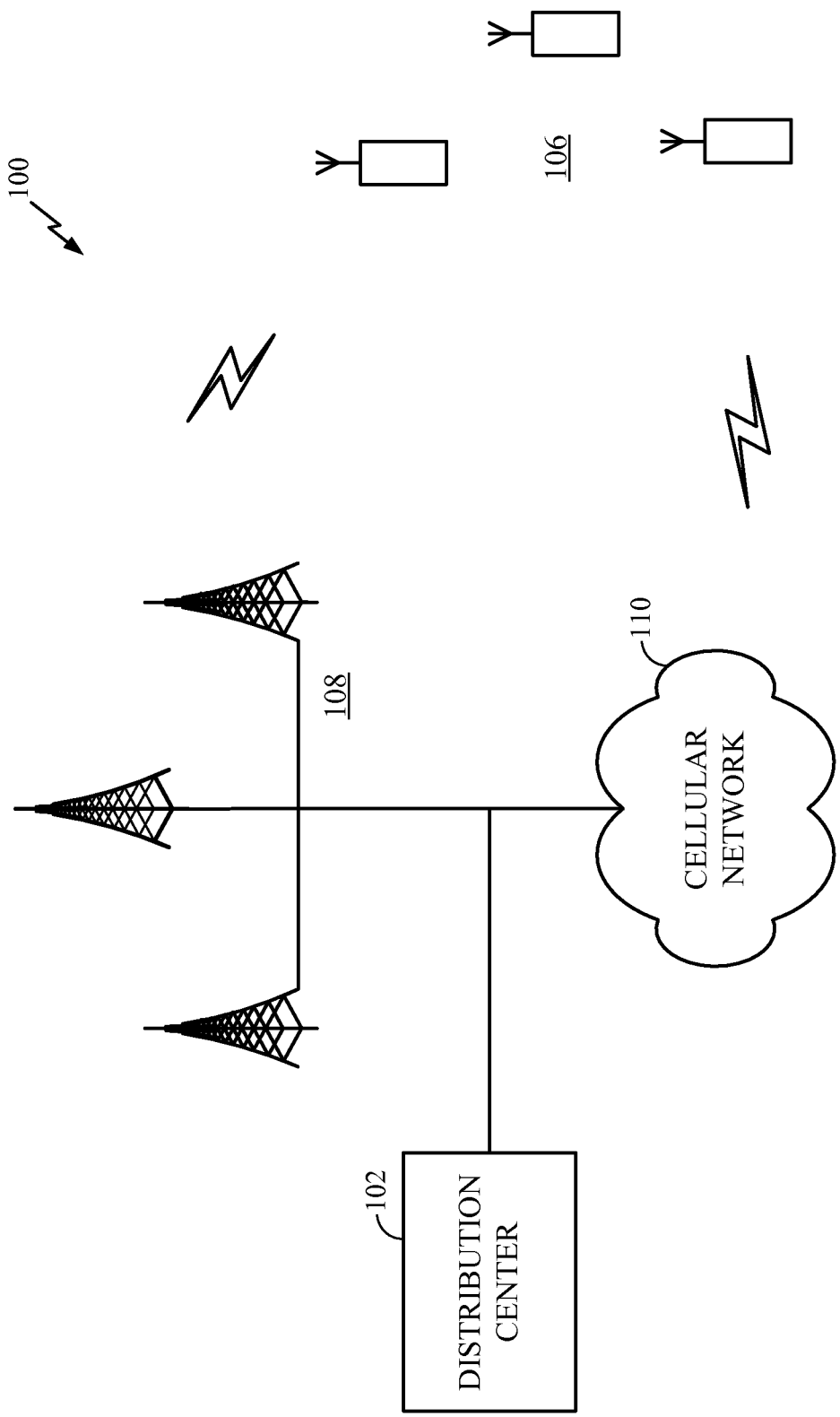
FIG. 1 is a conceptual block diagram illustrating an example of a multimedia broadcast system.

FIG. 1 is a conceptual block diagram illustrating an example of a multimedia broadcast system. The broadcast system 100 is shown with a distribution center 102 which serves as an access point for national and local content providers to distribute wide area and local area content to a large number of wireless subscriber units 106. In some geographic regions, the wide area and/or local area content is distributed directly to wireless subscriber units 106 through a network of transmitter units 108. The wide area and/or local area content may also be distributed to wireless subscriber units 106 through a cellular network 110.

A wireless subscriber unit 106 may be fixed or mobile and may also be called an access terminal, handset, wireless subscriber, wireless unit, wireless device, wireless communications device, wireless telecommunications device, wireless telephone, cellular telephone, user terminal, user equipment, mobile station, mobile unit, subscriber station, wireless station, mobile radio, radio telephone, or some other terminology. The wireless subscriber unit 106 may be a mobile telephone, a personal digital assistant (PDA), a personal or laptop computer, a game console, or other device capable of receiving wide area and/or local area content.

Figure 2:
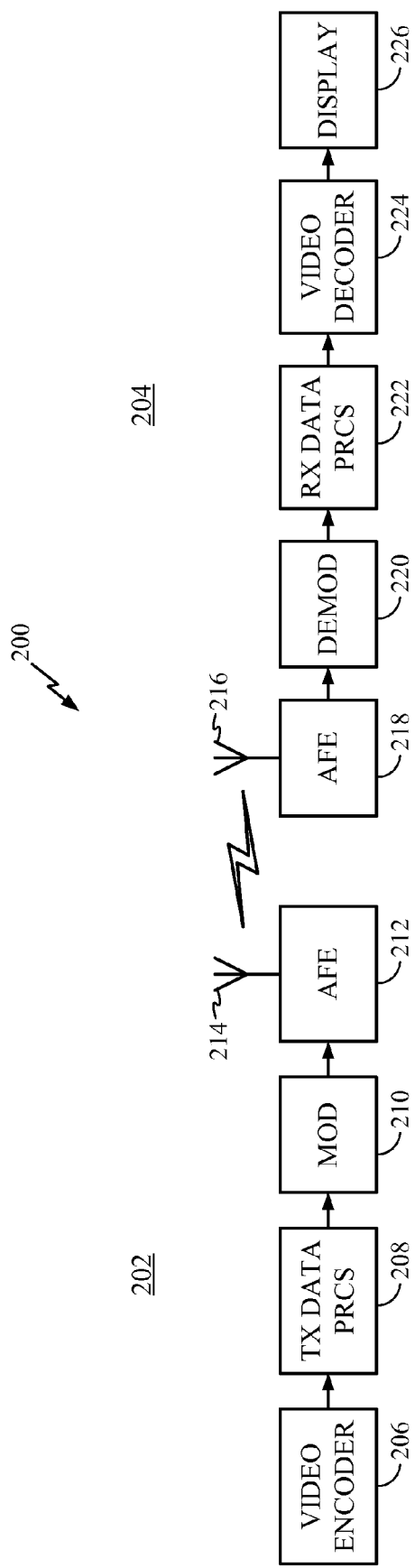
FIG. 2 is a conceptual block diagram illustrating an example of a transmitter and receiver in a multimedia broadcast system.

FIG. 2 is a conceptual block diagram of a transmitter 202 and receiver 204 in a multimedia broadcast system 200. In this configuration, the transmitter 202 may be part of a transmitter unit, or a base station, and the receiver 204 may be part of a wireless subscriber unit. Alternatively, the transmitter 202 may be part of a wireless subscriber unit and the receiver 204 may be part of a base station. In general, the transmitter 202 and receiver 204 may be part of any suitable devices that communicate over a transmission medium.

At the transmitter 202, a video encoder 206 encodes the frames of a video sequence. In one configuration of the video encoder 206, each frame is encoded as either an I-frame, P-frame, or B-frame. An I-frame, or "intraframe," is a frame of data that is processed by the video encoder 206 independent of the other frames in the video sequence. A P-frame, or "predicted frame," follows and an I-frame and contains only data that represents the change from the preceding I-frame in the video sequence. A B-frame, or "bi-directional frame," contains only data that either represents the change from the preceding frame or the difference in content from the next frame in the video sequence.

The encoding process includes transforming the data in each frame into discrete spatial frequency coefficients and quantizing the transform coefficients. In one configuration, the video encoder 206 splits the video sequence into two channels: a base channel and enhanced channel. The base channel has higher quantization than the enhanced channel.

The quantized transform coefficients are compressed using a suitable algorithm. A common compression algorithm is H.264 which utilizes entropy encoding. Entropy is a technique whereby short codes are used to replace frequently occurring coefficients and longer codes are used to replace less frequent coefficients. The result is a sequence of variable-length binary codes, that when combined with synchronization and control information, produces a compressed video bit stream.

A transmit (TX) data processor 208 processes (e.g., turbo encodes, interleaves, and symbol maps) the compressed video bit stream to produce data symbols. A modulator 210 performs OFDM modulation on the data symbols to produce OFDM symbols. An analog front end (AFE) 212 processes (e.g., converts to analog, amplifies, filters, and frequency upconverts) the OFDM symbols and generates a modulated signal, which is transmitted via an antenna 214.

At the receiver 204, an antenna 216 receives the modulated signal from the transmitter 202 and provides it to an AFE 218. The AFE 218 processes the modulated signal (e.g., filters, amplifies, and frequency downconverts) to recover the OFDM symbols. A demodulator 220 performs OFDM demodulation on the OFDM symbols to produce data symbol estimates, which are estimates of the data symbols sent by transmitter 202. The demodulator 220 provides the data symbol estimates to a receive (RX) data processor 222. The RX data processor 222 processes (e.g., symbol demaps, deinterleaves, and turbo decodes) the data symbol estimates to recover the compressed video bit stream. A video decoder 224 decodes the compressed video bit stream to produce a series of video frames for presentation to a display 226.

Figure 3A:
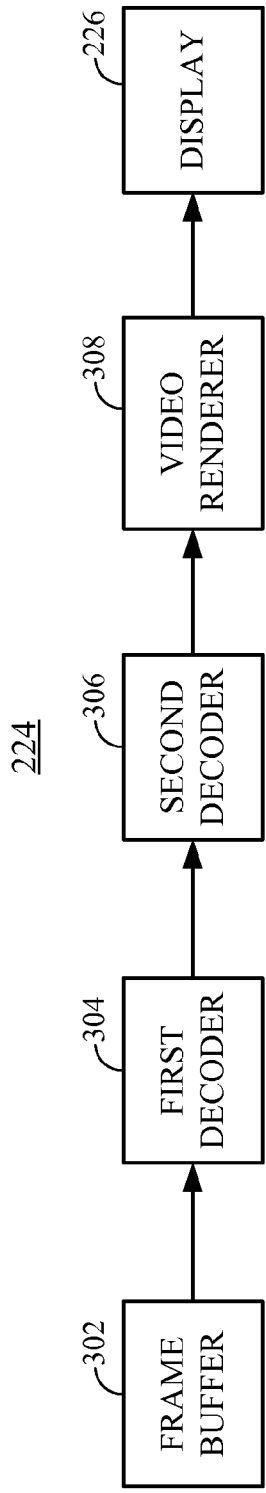
FIG. 3A is a conceptual block diagram illustrating an example of a video decoder.

FIG. 3A is a conceptual block diagram of a video decoder. The video decoder 224 includes a frame buffer 302 that buffers the compressed video bit stream output from the RX data processor 222 (see FIG. 2). The frame buffer 302 may also perform transport layer functions, such as flow control, handshake, and error detection/recovery. A first decoder 304 performs entropy decoding to recover the quantized transform coefficients for each video frame in the base and enhanced channels. The quantized transform coefficients are provided to a second decoder 306 for channel combining, inverse quantization, and inverse transformation to create a fully reconstructed video frame. In the case of P-frames and B-frames, the operations of the second decoder 306 are performed with reference to one or more adjacent video frames. A video renderer 308 synchronizes the video frames with the audio and presents the video frames to the display 226 (see FIG. 2) in the proper sequence at the appropriate frame rate.

As discussed earlier, the real time constraints of the system require that the average time to decode a video frame does not exceed $T_{AVG}$. This means that a certain number of P-frames and/or B-frames may require decoding in less than $T_{AVG}$ to compensate for any I-frames that require longer than $T_{AVG}$ to decode. Certainly, the video quality will improve when more I-frames are included in the video sequence, however, the video decoder 226 may not be able to meet the real time constraints of the system if the number of I-frames is too high.

In addition to the number of I-frames in any given video sequence, the hardware implementation of the receiver decoder may also impact its ability to meet the real time constraints of the system. An example of a hardware configuration of a receiver is shown in FIG. 4. Referring to FIGS. 2-4, the receiver 204 includes a digital signal processor (DSP) 402. The DSP 402 is a specific application processor designed to perform signal processing functions at high speed. In this example, the DSP 402 implements the demodulator 220 and RX data processor 208 functions in the receiver 204. A microprocessor 404 handles the interface to the display (not shown), deals with command and control signaling with the transmitter 202, and coordinates all other functions in the receiver 204. In one configuration of the receiver 204, the microprocessor 404 also performs the function of the first decoder 304 (i.e., entropy decoding). A video core 406 is used to provide the function of the second decoder 306 (i.e., create fully reconstructed video frames from the quantized transform coefficients). In one configuration, the video core 406 may be implemented with an application specific integrated circuit (ASIC). The audio circuitry 408 is used to provide the audio for the frames in the video sequence. Finally, the AFE 410 processes the modulated signal received by the antenna 412.

The use of the microprocessor 404 to perform entropy decoding could result in some uncertainty as to the video decoder's ability to meet the real time constraints of the system. In this configuration, the entropy decoding function must compete with other receiver functions for a limited amount of processing resources. As a result, the video decoder 226 may not be able to maintain an average decoding time of $T_{AVG}$.

The inability of the video decoder 226 to meet the real time constraints of the system may result in frames arriving at the video renderer 308 late. Any frame that arrives at the video renderer 308 after its presentation time must be dropped to maintain synchronization between the video and the audio. As a result, the video decoder 226 may waste valuable processing resources decoding frames that will never be used. Thus, a significant improvement in performance may be realized if video frames can be dropped before decoding when the average time to decode a frame increases beyond the real time constraints of the system.

Figure 3B:
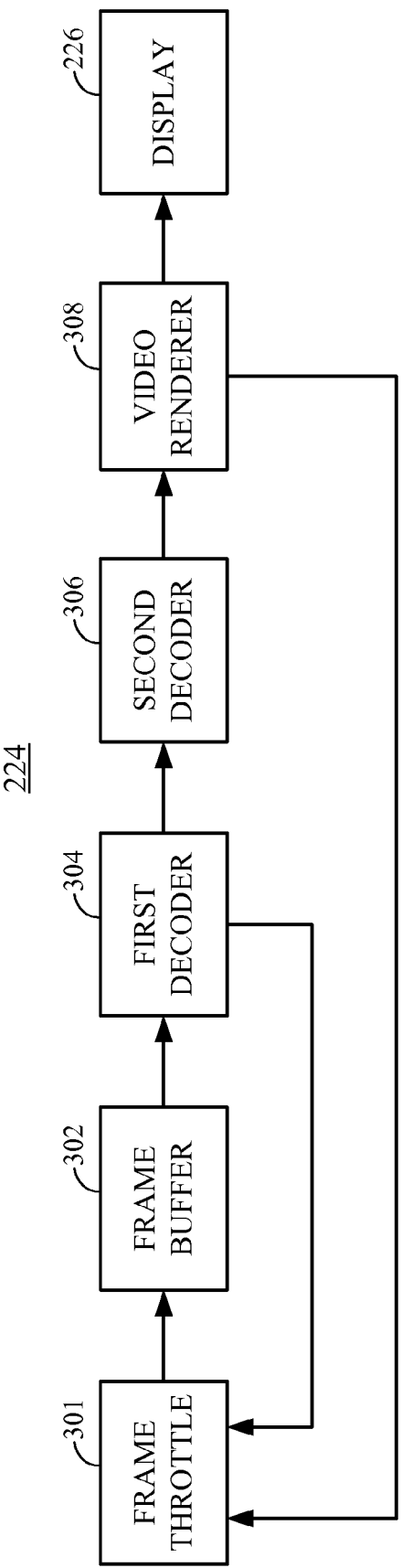
FIG. 3B is a conceptual block diagram illustrating an example of a video decoder with a frame throttle.

Turning to FIG. 3B, a frame throttle 301 is used to discard video frames before they pass through the frame buffer 302. In one configuration of the video decoder 226, feedback from the first decoder 304 is provided to the frame throttle 301. This feedback provides a measurement of the time it takes to decode each video frame. The frame throttle 301 provides these measurements to a prediction module (not shown) to compute an estimate of the time it will take to compute the upcoming video frame. The frame throttle 301 may increase the frame drop rate when the predicted estimate increases and decrease the frame drop rate when the predicted estimate decreases.

The frame throttle 301 also receives feedback from the video renderer 308. This feedback provides a measurement to the frame throttle 301 every time the video renderer 308 analyzes a video frame at the head of its queue (not shown). If the video frame is on time, the measurement is zero. If the frame is late, the measurement indicates how late the frame is. The frame throttle 301 may increase the frame drop rate when the average measurement increases and decrease the frame drop rate when the average measurement decreases.

Those skilled in the art will readily appreciate that various frame throttle algorithms may be used to adjust the frame drop rate based on feedback from the first decoder 304 and the video rendered 308. The specific algorithm employed may depend on a variety of factors including the specific application, the quality of service requirements, and the overall design constraints imposed on the system. In one configuration, where the first decoder 304 is implemented with a microprocessor or some other shared processing resource, the frame throttle 301 may implement an aggressive frame dropping policy when the microprocessor is heavily loaded and relax the frame dropping policy when the load on the microprocessor is reduced.

Figure 5:
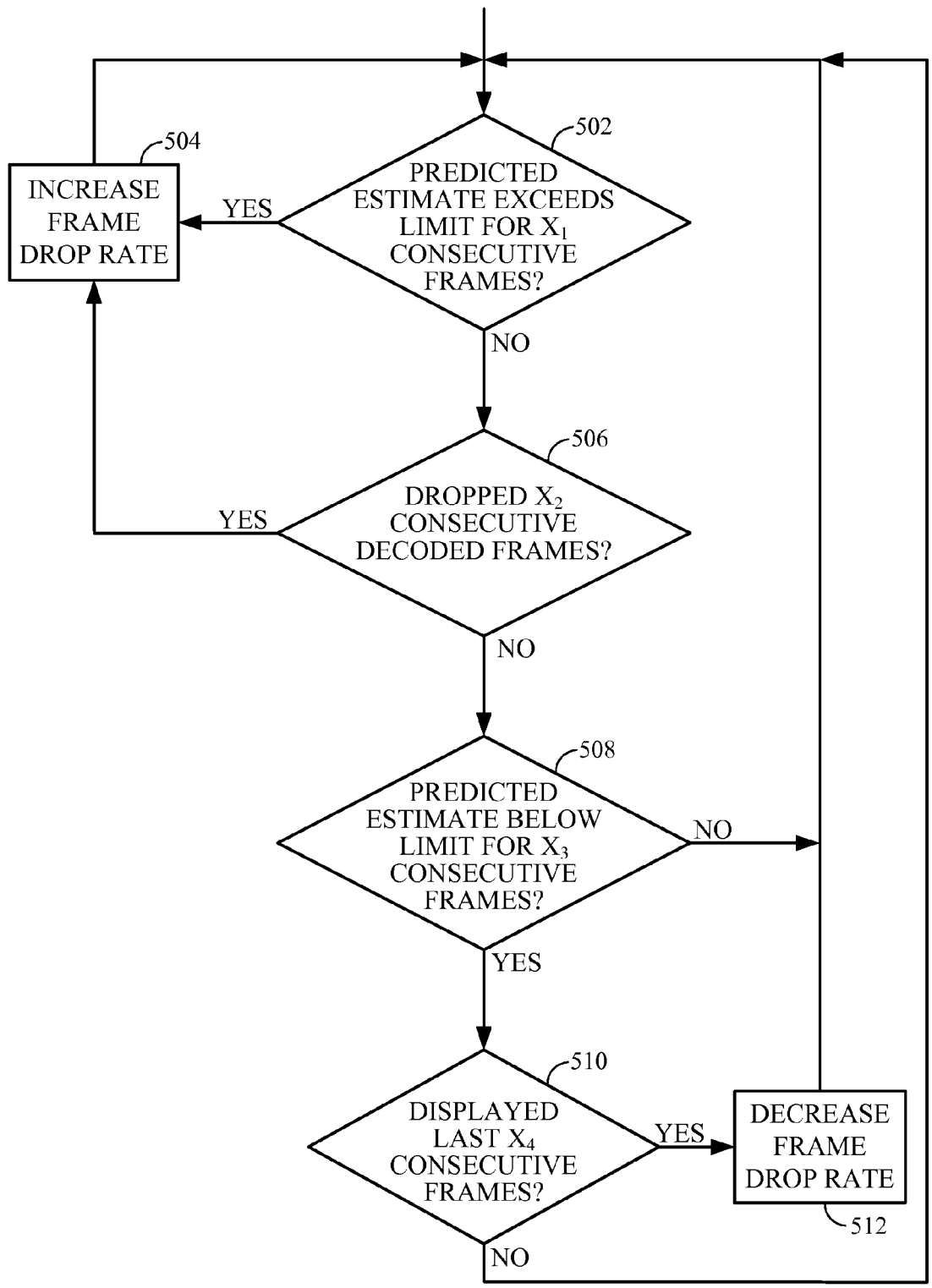
FIG. 5 is a flow chart illustrating an example of a frame dropping policy implemented by a frame throttle in a video decoder.

An example of a frame throttle algorithm will be described with reference to FIG. 5. In step 502, the frame throttle determines whether the predicted estimate has exceeded the real time decoding limit for $x_1$ consecutive frames. The frame throttle increase the frame drop rate in step 504 if the predicted estimate has exceeded the real time decoding limit for $x_1$ consecutive frames. Otherwise, the frame throttle algorithm proceeds to step 506.

In step 506, the frame throttle determines whether the video renderer has dropped $x_2$ consecutive frames. The frame throttle increase the frame drop rate in step 504 if the video renderer has dropped $x_2$ consecutive frames. Otherwise, the frame throttle algorithm proceeds to step 508.

In step 508, the frame throttle determines whether the predicted estimate has been less than the real time decoding limit for $x_3$ consecutive frames. The frame throttle algorithm returns to step 502 if the predicted estimate has not been less than the real time decoding limit for $x_3$ consecutive frames. Otherwise, the frame throttle algorithm proceeds to step 510.

In step 510, the frame throttle determines whether the video renderer has displayed the last $x_4$ consecutive frames. The frame throttle decreases the frame drop rate in step 512 if the video renderer has displayed the last $x_4$ consecutive frames. Otherwise, the frame throttle algorithm returns to step 502.

When dropping video frames, the frame throttle should carefully choose which frames to drop. Randomly discarding video frames could result in poor picture quality. Returning to FIG. 3B, the frame throttle 301 may attempt to recover from an increase in the average decoding time by dropping the video frames with the least amount of informational content. By way of example, in a multimedia broadcast system that includes both enhanced and base IPB frames, the frame throttle 301 may first drop the B-frames in the enhancement channel. If the average decoding time cannot be reduced to $T_{AVG}$ after dropping the B-frames in the enhancement channel, the frame throttle 301 may begin dropping B-frames in the base channel. The frame throttle 301 may become more aggressive if it cannot recover after dropping B-frames by first dropping P-frames in the enhancement channel followed by P-frames in the base channel. Under this frame dropping policy, the frame throttle would drop I-frames last, dropping I-frames in the enhancement channel before dropping I-frames in the base channel. This policy would tend to promote the highest picture quality Alternatively, the frame throttle 301 may implement a frame dropping policy that responds quicker to an increase in the average decoding time. By way of example, the frame throttle 301 may first drop frames with high informational content, such as P-frames in the base or enhanced channels. A more aggressive frame dropping policy may call for some I-frames to be dropped to recover faster from an increase in the average decoding time. In some configurations, the frame throttle 301 may implement a policy that balances the tradeoffs between high picture quality and fast recovery time. Those skilled in the art will be readily able to determine the best suited frame dropping policy for the particular application based on the performance requirements and the overall design constraints imposed on the receiver.

Figure 6:
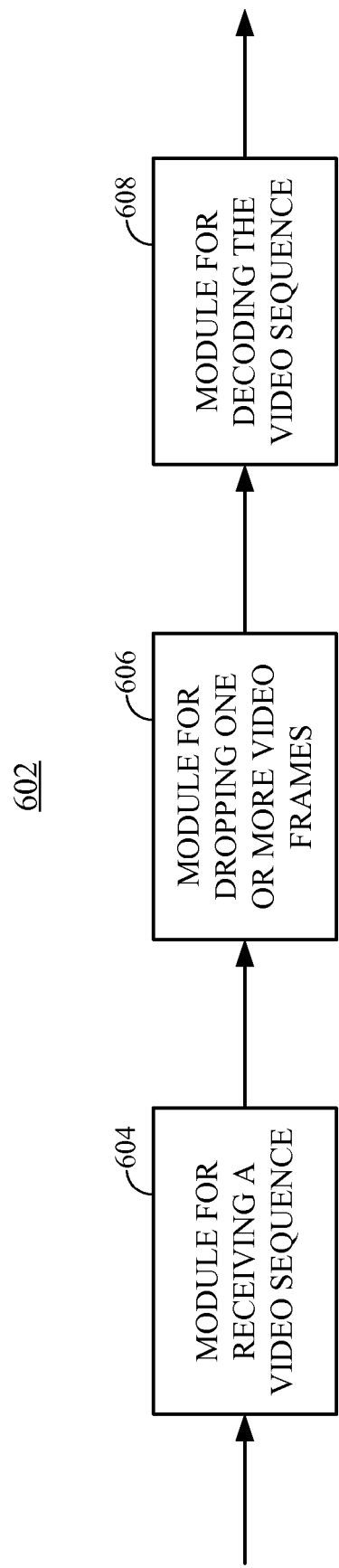
FIG. 6 is a functional block diagram illustrating an example of a receiver.

FIG. 6 is a functional block diagram illustrating a receiver. The receiver 602 includes a module 604 for receiving a video sequence comprising a plurality of video frames, a module 608 for decoding the video sequence, and a module 606 for dropping one or more of the video frames from the video sequence before providing the video sequence to the decoding means.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
   a video decoder configured to decode a video sequence comprising a plurality of video frames, thereby producing a plurality of decoded video frames;
   a video renderer configured to drop one or more of the decoded video frames before presenting decoded video frames to a display; and
   a frame throttle configured to receive the video sequence, the frame throttle being further configured to drop one or more of the video frames from the video sequence before providing the video sequence to the video decoder, wherein the number of video frames dropped by the frame throttle is a function of the number of decoded video frames dropped by the video renderer,
   wherein the plurality of video frames comprise I-frames, P-frames, and B-frames in a base layer and an enhancement layer, the frame throttle being further configured to drop B-frames in the enhancement layer before dropping B-frames in the base layer, and configured to drop B-frames in both the base layer and the enhancement layer before dropping P-frames or I-frames in the enhancement layer.

2. The receiver of claim 1 wherein the frame throttle is further configured to adjust the rate of the video frames dropped from the video sequence to meet a target frame rate for a display.

3. The receiver of claim 1 wherein the number of video frames dropped by the frame throttle is a function of the decoding time of the video decoder.

4. The receiver of claim 1 wherein the number of video frames dropped by the frame throttle is a function of feedback from the video decoder.

5. The receiver of claim 4 wherein the feedback indicates the time to decode each of the video frames in the video sequence provided to the video decoder.

6. The receiver of claim 5 wherein the frame throttle is further configured to use the feedback to predict the time required to decode one or more of the video frames in the video sequence received by the frame throttle, the frame throttle being further configured to use the time prediction to determine which frames in the video sequence to drop.

7. The receiver of claim 1 wherein at least a portion of the video decoder is implemented on a processor configured to support other receiver functions.

8. The receiver of claim 1 wherein the video frames in the video sequence received by the frame throttle have different amounts of informational content, the frame throttle being further configured to determine which of the one or more video frames to drop as a function of the amount of informational content in the video frames.

9. A method of decoding video frames, comprising:
   receiving a video sequence comprising a plurality of video frames;
   decoding the video sequence, thereby producing a plurality of decoded video frames;
   dropping one or more of the decoded video frames before presenting decoded video frames to a display; and
   dropping one or more of the video frames from the video sequence before decoding the video sequence, wherein the number of video frames dropped before decoding the video sequence is a function of the number of decoded video frames dropped before presenting decoded video frames to the display,
   wherein the plurality of video frames comprise I-frames, P-frames, and B-frames in a base layer and an enhancement layer, the method further comprising dropping B-frames in the enhancement layer before dropping B-frames in the base layer, and dropping B-frames in both the base layer and the enhancement layer before dropping P-frames or I-frames in the enhancement layer.

10. The method of claim 9 further comprising adjusting the rate of the video frames dropped in the video sequence to meet a target frame rate for a display.

11. The method of claim 9 wherein the number of video frames dropped from the video sequence is a function of the decoding time.

12. The method of claim 11 further comprising using the decoding time to predict the time required to decode one or more of the video frames in the video sequence, and using the time prediction to determine which frames in the video sequence to drop.

13. The method of claim 9 wherein the video frames in the video sequence have different amounts of informational content, the method further comprising determining which of the one or more video frames to drop from the video sequence as a function of the amount of informational content in the video frames.

14. A receiver, comprising:
   means for receiving a video sequence comprising a plurality of video frames;
   means for decoding the video sequence, thereby producing a plurality of decoded video frames;

means for dropping one or more of the decoded video frames before presenting decoded video frames to a display; and means for dropping one or more of the video frames from the video sequence before providing the video sequence to the decoding means, wherein the number of video frames dropped before decoding the video sequence is a function of the number of decoded video frames dropped before presenting decoded video frames to the display, wherein the plurality of video frames comprise I-frames, P-frames, and B-frames in a base layer and an enhancement layer, the means for dropping further comprising means for dropping B-frames in the enhancement layer before dropping B-frames in the base layer, and means for dropping B-frames in both the base layer and the enhancement layer before dropping P-frames or I-frames in the enhancement layer.

15. The receiver of claim 14 further comprising means for adjusting the rate of the video frames dropped from the video sequence to meet a target frame rate for a display.

16. The receiver of claim 14 wherein the number of video frames dropped is a function of the decoding time of the decoding means.

17. The receiver of claim 14 wherein the number of video frames dropped is a function of feedback from the decoding means.

18. The receiver of claim 17 wherein the feedback indicates the time to decode each of the video frames in the video sequence provided to the decoding means.

19. The receiver of claim 18 wherein the means for dropping the one or more video frames uses the feedback to predict the time required to decode one or more of the video frames in the video sequence, and uses the time prediction to determine which frames in the video sequence to drop.

20. The receiver of claim 14 wherein at least a portion of the decoding means is implemented on a processor configured to support other receiver functions.

21. The receiver of claim 14 wherein the video frames in the video sequence have different amounts of informational content, the receiver further comprising means for determining which of the one or more video frames to drop as a function of the amount of informational content in the video frames.

22. A non-transitory computer-readable storage medium storing instructions that, when executed, cause a processor of a device for video coding to:

receive a video sequence comprising a plurality of video frames;

decode the video sequence, thereby producing a plurality of decoded video frames;

drop one or more of the decoded video frames before presenting decoded video frames to a display; and drop one or more of the video frames from the video sequence before decoding the video sequence, wherein the number of video frames dropped before decoding the video sequence is a function of the number of decoded video frames dropped before presenting decoded video frames to the display, wherein the plurality of video frames comprise I-frames, P-frames, and B-frames in a base layer and an enhancement layer, and the instructions, when executed, further cause the processor of the device for video coding to drop B-frames in the enhancement layer before dropping B-frames in the base layer, and to drop B-frames in both the base layer and the enhancement layer before dropping P-frames or I-frames in the enhancement layer.

* * * * *